United States Patent
Schultz

[15] 3,698,118
[45] Oct. 17, 1972

[54] DEVICE FOR ATTACHING FISHING REELS TO FISHING TACKLES

[72] Inventor: Rudolf Schultz, Berlin, Germany

[73] Assignee: Deutsche Angelgerate Manufaktur (DAM) Hellmuth Huntze Gesellschaft mit beschrankter Haftung & Co. Kammanditgesellschaft, Berlin, Germany

[22] Filed: Oct. 23, 1969

[21] Appl. No.: 868,765

[30] Foreign Application Priority Data

Oct. 25, 1968 Germany.........G 68 04 685.5

[52] U.S. Cl. .................................................. 43/22
[51] Int. Cl. .............................................. A01k 87/06
[58] Field of Search .................................. 43/22, 23

[56] References Cited

UNITED STATES PATENTS

| 3,295,244 | 1/1967 | Kuntze | 43/22 |
| 2,592,878 | 4/1952 | Esposito | 43/22 |
| 402,594 | 5/1889 | Hook | 43/22 |

Primary Examiner—Melvin D. Rein
Attorney—Richards and Geier

[57] ABSTRACT

A fishing reel having a T-shaped base is attached to a fishing tackle the handle of which has the shape of a hollow cylindrical tube with two cylindrical sleeves mounted on the handle and movable relatively to each other. The sleeves are located on opposite sides of the reel base and each of them has a shoe-like extension with an inclined surface extending over a separate flange of the base. Each sleeve is enclosed by a cover which is a poor conductor of heat. The sleeves and their covers are held by a cap which can be screwed upon the reel handle, whereby the base is firmly clamped. The cap has an annular space for receiving a rotary radial flange located upon that side of the sleeve which is opposite its shoe-like extension. The present invention is particularly characterized in that the cap consists of two parts which engage each other while forming an annular space and which are rigidly interconnected after the insertion of the flange, the part of the cap located away from the sleeve being provided with screw threads.

1 Claim, 4 Drawing Figures

Inventor:
R. Schultz
By Richards & Geier
ATTORNEYS

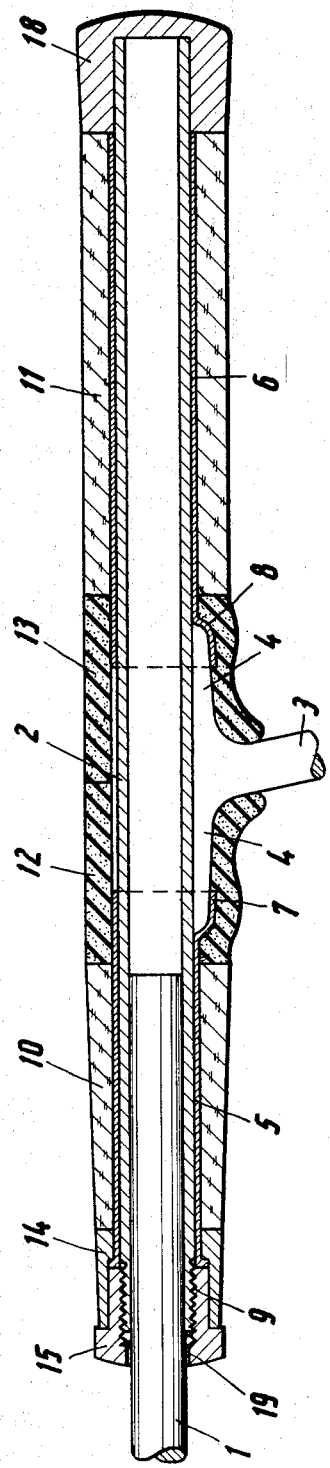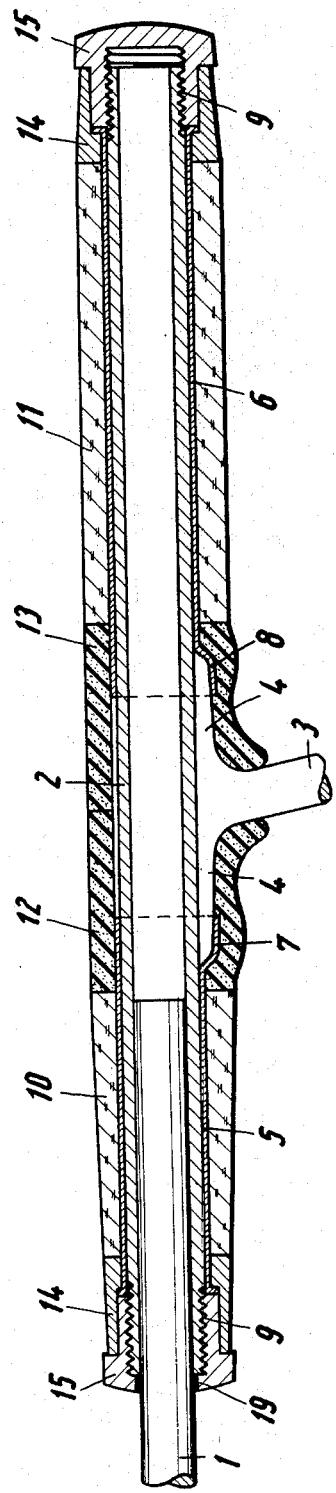

DEVICE FOR ATTACHING FISHING REELS TO FISHING TACKLES

This invention relates to a device for attaching a fishing reel having a T-shaped base to a fishing tackle.

Existing devices of this type include a rod handle having the shape of a hollow cylindrical tube and carrying two cylindrical sleeves which are movable relatively to each other and are located on opposite sides of the base of the reel. Each sleeve has a shoe-like extension with an enclined surface extending over and in engagement with a separate flange of the reel base. Each sleeve is enclosed by a cover which is a poor conductor of heat. The sleeves and their covers are firmly held by a cap which can be screwed upon the handle, thereby firmly clamping the reel base. The cap has an annular space for receiving a rotary radial flange which is located upon that side of the sleeve which is opposite its shoe-like extension.

A drawback of these devices consists in that the cap is made of one piece so that the insertion of the radial flange into the annular space is possible only by operations changing the shapes of various parts.

An object of the present invention is to eliminate these drawbacks of prior constructions and provide an economical way of connecting the parts.

Other objects of the present invention will become apparent in the course of the following specification.

In the accomplishment of the objectives of the present invention it was found advisable to make the cap of two parts which engage each other while forming an annular space and which are rigidly interconnected after the insertion of the flange, the part located away from the sleeve carrying the screw threads. This construction prevents a complete screwing off of the cap; instead, it provides a gradual removal of the shoe-like extensions from the flanges of the base of the fishing reel, so that it is not necessary to loosen the flanges manually, the danger of an improper manual loosening being that the fishing reel may get lost.

When the cap is located at the rear end of the handle, there is the danger that the cap will become loose unintentionally and the reel will be freed. The cap is better protected against unintentional handling by being located upon the other side of the handle. According to a further feature of the present invention the part of the cap located away from the sleeve has a central opening for the rod.

In accordance with a further advantageous improvement of the present invention caps can be provided upon both ends of the handle. This arrangement provides a larger passage for loosening the connection, so that even when reels have comparatively long flanges, they can be removed with caps of normal length. Caps of the same size can thus be used for different constructions for flanges of different lengths, so that their manufacture is considerably less expensive.

The invention will appear more clearly from the following detailed description when taken in connection with the accompanying drawings, showing, by way of example only, preferred embodiments of the inventive idea.

In the drawings:

FIG. 3 is a longitudinal section through a somewhat differently constructed rod handle;

FIG. 4 is a longitudinal section through another construction of the rod handle.

In all illustrated constructions the fishing reel is fixed to the handle of a fishing tackle.

Figure 1:
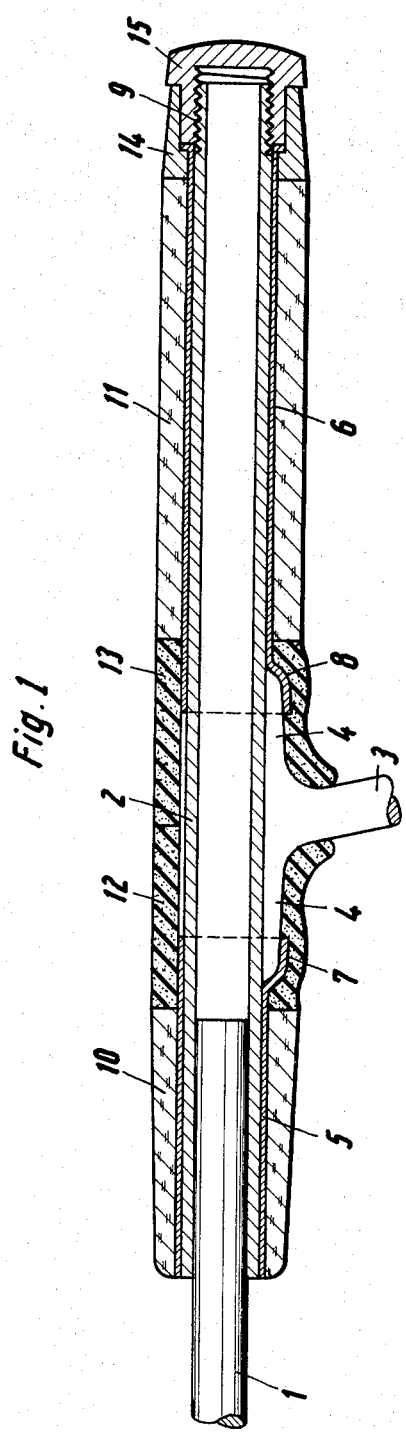
FIG. 1 is a longitudinal section through a fishing rod handle having a reel attaching device of the present invention.

FIG. 1 shows a fishing rod 1 having an end inserted into a tubular handle 2 and firmly connected therewith by any suitable means (not shown). A fishing reel which is not further illustrated has a base consisting of a foot 3 with opposed flanges 4 engaging the tubular handle 2. Two sleeves 5 and 6 are mounted upon the handle 2; they are located on opposite sides of the foot 3 and have shoe-like extensions 7 and 8 which are directed toward the foot 3 and extend over the flanges 4. The sleeve 5 is attached to the handle 2 by any suitable means (not shown). The sleeve 6 is slidable upon the handle 2. The handle 2 has a threaded end 9. An end cap 14, 15 which will be described in detail hereinafter, can be screwed upon the end 9, and is used to hold firmly the foot 3 with its flanges 4 between the two sleeves 5 and 6.

Each of the sleeves 5 and 6 is enclosed by two adjacent covers consisting of substances which are poor heat conductors. The sleeve 5 is enclosed by a cover 10 consisting of cork or a plastic material and an adjacent cover 12 made of rubber. Similarly, the sleeve 6 is enclosed by a cover 11 made of cork or a plastic material and a cover 13 made of rubber. Since the cap also presses against the covers, they are pressed against each other when the cap is screwed on and then the rubber covers 12 and 13 will tightly enclose the foot 3 of the reel; differences in length have been compensated. If necessary, the rubber covers 12 and 13 can be provided with corresponding recesses.

Figure 2:
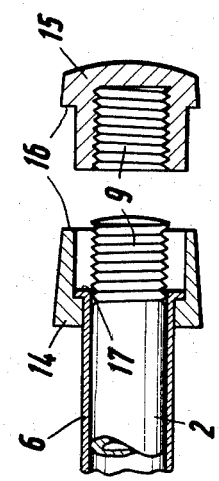
FIG. 2 is a section through some of the parts shown in FIG. 1.

In accordance with the present invention the cap consists of two parts 14 and 15 shown in FIG. 2. The outer cap 15 which is screwed upon the handle end 9, has a sleeve-like portion extending into a space provided in the inner cap portion 14. The cap portion 15 has an annular surface 16 engaging an end of the cap portion 14. The two cap portions provide an inner annular space in which a radial flange 17 is located. The flange 17 constitutes an end of the sleeve 6 and is freely rotatable in the annular space. The cap portion 14 is mounted upon the sleeve 6 and engages the flange 17 from one side. After the cap portion 15 has been introduced into the cap portion 14, the two cap portions are firmly connected with each other, preferably by gluing. However, pins or other suitable connecting means may be used.

When the cap 14, 15 is unscrewed, the sleeve 6 will move along with it, so that a flange 4 of the reel will be freed to such an extent that the reel can be removed from the fishing rod. Since the sleeve 6 extends over a substantial length of the handle 2, there is no danger that this sleeve carrying the cap 14, 15 may be lost.

The construction shown in FIG. 3 is fairly similar to that shown in FIG. 1, similar parts being designated by the same numerals. However, in the construction of FIG. 3 the free end of the handle 2' is firmly connected with a one piece cap 18. Therefore the sleeves 5 and 6 and the covers 10, 12 and 11, 13 must not be joined to the handle. That end of the handle 2' through which the fishing rod 1 extends is provided with screw threads 9' upon which the cap 14', 15' is mounted. The cap 14', 15' is similar in construction to the cap 14, 15 shown in FIGS. 1 and 2. However, the cap portion 15' has a central opening 19 for the passage of the fishing rod 1.

FIG. 4 shows a construction wherein the handle 2'' has screw threads 9 upon its rear end and screw threads 9' upon its other end through which the fishing rod 1 extends. The screw threads 9 upon the rear end are covered by the cap 14, 15 similar to the one shown in FIG. 1, while the screw threads 9' upon the other end are covered by a cap 14', 15' similar to that shown in FIG. 3, the cap portion 15' being provided with an opening 19 for the fishing rod. In this construction as well, the sleeves 5 and 6 and the covers 10, 12 and 11, 13 are not joined to the handle 2. In other respects the construction of FIG. 4 corresponds to that of FIGS. 1 and 2.

The present invention is also applicable for connections wherein the shoe-like extensions of the sleeves have graded supporting surfaces for the flanges of the fishing reels, as described in the German patent No. 1,211,852.

I claim:

1. In a fishing tackle adapted to carry a flange supported reel, in combination, an elongated tubular handle having front and rear ends, a fishing rod extending through the front end of the handle and firmly connected with the handle, two sleeves mounted upon said handle, at least one of said sleeves being movable relatively to the other sleeve, said sleeves having opposed shoe-like extensions for engaging the reel flange, covers enclosing said sleeves, said covers being poor heat transmitters, at least said one sleeve having an end flange located adjacent one of the ends of said handle, and a double cap enclosing said one end of the handle and comprising an inner cap part having an annular space enclosing said flange and an outer cap part having a tubular portion fitting into said space, said tubular portion having inner screw threads, said one end of the handle having screw threads meshing with the inner screw threads of the tubular portion, said two cap parts being firmly interconnected.

* * * * *